Patented Sept. 11, 1934

1,973,172

UNITED STATES PATENT OFFICE 1,973,172

PROCESS OF REFINING WOOD ROSIN

Henry R. Lee, South Milwaukee, Wis., assignor, by mesne assignments, to Newport Industries, Inc., a corporation of Delaware No Drawing. Application October 1, 1930, Serial No. 485,825

13 Claims. (Cl. 202—52)

This invention relates to a process for refining wood rosin to obtain therefrom very pale grades of rosin adapted as a substitute for gum rosin in the technical arts.

Wood rosin, a product of high commercial importance, came into existance about twenty years ago, and has been increasingly exploited commercially ever since. Its great practical value is due to the fact that there is a constantly increasing demand for rosin in such technical arts as the paper, varnish and soap industries and the supply of gum rosin, which was formerly the only rosin available in commercial quantities, is continually decreasing. This is caused by the depletion in the United States of the pine forests from which gum rosin and turpentine are obtained by tapping the trees. Wood rosin, on the other hand, is extracted from stumps or waste wood of certain species of pine of which there appears to be an inexhaustible supply for many years to come. This form of rosin is therefore being proposed as a substitute for gum rosin in the technical industries.

Such attempted substitution, however, presents a difficult problem, in that wood rosin and gum rosin are neither physically nor chemically the same. Although both types of rosin consist predominantly of abietic acid, this substance may exist in the two rosins in several isomeric or polymeric forms. Moreover, these various forms of abietic acid may be present in different proportions in the two types of rosin, thereby giving to said rosins different physical and chemical properties. In addition, each of these rosins contains considerable percentages of other substances, soluble in abietic acid and in each other, which are not necessarily identical in the two rosins and accordingly cause a further increase in the chemical and physical difference between said rosins. Wood rosin in particular contains a high percentage of the non-acid gummy substances known as "resenes" which modify the properties of the entire rosin to such an extent as to render it unsuitable for many of the uses for which gum rosin is ordinarily employed. Again, other substances, known as "nigre", impart a dark color to wood rosin and render it difficult to obtain pale grades of this rosin. The differences in chemical and physical behavior between wood rosin and gum rosin greatly affect and alter the problems of purifying these two forms of rosin. As a matter of fact, the purification of wood rosin has very little in common with the purification of gum rosin and hence most of the art pertaining to the refinement of the latter is practically inapplicable to the refinement of the former.

A striking illustration of this is presented by the method of refining by vacuum distillation. This process was applied to gum rosin as early as 1890, as evidenced by the work of Bischoff and Nastvogel (Berichte, Volume 23, page 1919) who, in that year, distilled gum rosin under an absolute pressure of 30 to 110 mm. of mercury. Later, Donk (U. S. Patent No. 1,219,413 of 1915) developed a continuous process for the low pressure distillation of gum rosin using an absolute pressure of about 100 mm. It is claimed that both of these processes produce satisfactory results when applied to gum rosin. When applied to wood rosin, however, these processes produce distillates of a lower abietic acid content than the initial material. Wood rosin contains substances which are not stable at elevated temperatures, and when the above processes are applied to this rosin, a considerable decomposition of said substances takes place. The gases liberated by this decomposition destroy the vacuum in the distilling chamber while the products produced distill over and contaminate the distillate.

The above difficulties in the art of refining wood rosin have been overcome to a great extent in my process which is described in detail hereinafter.

It is, accordingly, an object of this invention to provide a process for producing pale, high grade wood rosin.

It is a further important object of this invention to provide a process for vacuum distilling wood rosin to produce a pale high grade product therefrom.

A further object of this invention resides in the production of a wood rosin of such improved character that it may be used in the technical arts as a substitute for gum rosin.

Other and further important objects of this invention will become apparent from the following description and appended claims.

I have found that wood rosin can be effectively distilled, without substantial decomposition, by using extremely high vacuum, for instance by using an absolute pressure as low as 1 to 6 mm. of mercury. Distillation under these conditions effects a high degree of separation between the rosin and its coloring matters, permitting the isolation as a main fraction of the distillate (to the extent of about 66%) of an extremely pale wood rosin corresponding to grade WW or X on the standard rosin-grading scale. This distillation also affects in some manner the crystallizing properties of said main fraction of the distillate, whereby the rosin obtained from the same will give a high yield of abietic acid by crystallization from a solvent as described in detail in the co-pending application of Lee et al, Serial No. 290,023, filed July 2nd, 1928. Whether this is due to a clean cut separation from the "resenes", or to thermal inversion of certain isomers of the abietic acid into other isomers, I am not prepared to say. But the fact remains that untreated wood rosin and many of the finer grades of this rosin which have been prepared by other methods do not yield abietic acid by crystallization, whereas my product does.

My end product is further highly adapted for many of the uses to which only gum rosin was heretofore applicable, such as the manufacture of esters and salts (cobalt, calcium, nickel, manganese and the like) for pale varnishes and lacquers, the manufacture of rosin-soaps (sodium or potassium salts) and paper sizing.

The following example, in which parts by weight are given, serves to more fully illustrate the nature of my invention.

*Example*

100 parts by weight of wood rosin of grade E or F having a melting point of about 54° C. and an abietic acid content of about 80 to 83%, are charged into a closed still connected to a high-vacuum pump. A vacuum of about 2 to 4 mm. is then applied. The still is heated to about 220° C. and maintained at about 220 to 270° C. and at the above pressure throughout the distillation. The distillate is condensed and collected in two separate fractions or "cuts". The first fraction or forerun amounting to about 9 to 15 parts by weight is collected separately and constitutes a semi-fluid mass which does not solidify on standing. Its abietic acid content is quite low, about 57 to 61%.

A second fraction amounting to about 60 to 66 parts by weight is then taken off. This cut solidifies into an extremely light colored rosin grading on the standard rosin scale as high as WW or X or even higher. It has a melting point of about 54 to 60° C. and an abietic acid content of about 85 to 90%. This product is highly suitable for the manufacture of pure abietic acid by crystallization from a suitable solvent. After removal of the above fraction there remains in the still a dark, high-melting pitch of low abietic acid content (about 5 to 7%).

The first fraction or forerun obtained in the distillation may, if desired, be refractionated and a further quantity of high grade rosin (WW to X or higher) isolated therefrom.

Instead of starting with rosin of grade E or F, other grades may be used. It is obvious that the higher the grade of the initial material as to paleness and abietic acid content, the greater will be the amount of the main fraction of distillate obtained. The amount of forerun taken off may vary from 5 to 20% depending on the quality of the initial material and the desired quality of the main fraction. A good procedure to follow in this respect is to take off the forerun until the abietic acid content of the material distilling over approaches the abietic acid content of the starting material.

Similarly, it is advisable to cease collecting the main fraction of distillate as soon as the abietic acid content of the material distilling over drops below that of the initial material. In such a case a third fraction may be collected and added to the forerun for redistillation therewith. The main fraction collected may, if desired, be divided into further fractions. In this manner, fractions yielding a rosin containing as high as 95% abietic acid and a melting point as high as 70° C. may be isolated.

The pressure in the still may be varied from 1 to 6 mm. absolute with a corresponding temperature variation from 220 to 270° C. For best results, aluminum or enameled iron condensers and receivers should be used to insure against contamination of the end product with iron salts. Generally, however, the still may be made of iron or any other suitable material as the salts formed by the reaction of the rosin with the material of the still will remain in the residue. Inert gases or steam may be swept through the still, but such procedure is not to be preferred, since it increases the difficulty and cost of maintaining the high vacuum.

It can thus be appreciated that I have discovered a new method for refining wood rosin to produce therefrom a grade of rosin of a paleness and quality not known prior to my invention.

While I have disclosed a preferred embodiment of my invention, it should be understood that I do not intend to be limited in the patent granted thereon except as necessitated by the prior art.

What I claim is:

1. The process of refining wood rosin which comprises distilling the same under an absolute pressure not greater than 6 mm. of mercury, and isolating an intermediate fraction.

2. The process of refining wood rosin which comprises distilling the same under a pressure of about 2 to 6 mm. of mercury, absolute, separating a forerun to a point where the abietic acid content of the distillate approaches that of the initial material and recovering a subsequent fraction to a point where the abietic acid content of the distillate falls below that of the initial material.

3. The process of refining wood rosin which comprises distilling the same under an absolute pressure of about 2 to 4 mm. of mercury, separating a forerun amounting to about 5 to 20% of the initial material, and recovering a subsequent fraction to a point where the abietic acid content of the material distilling over drops below that of the initial material.

4. The process of refining wood rosin which comprises distilling the same under an absolute pressure of about 2 to 4 mm. of mercury, separating a forerun to a point where the abietic acid content of the distillate approaches that of the initial material and recovering a subsequent fraction amounting to about 60 to 66% of said original material.

5. The process of refining wood rosin which comprises distilling wood rosin of grade E to F under an absolute pressure of about 2 to 4 mm. of mercury, separating a forerun amounting to about 9 to 16% of the initial material and recovering a subsequent fraction amounting to about 60 to 66% of said initial material.

6. In a process for refining wood rosin, the step which comprises distilling the same under a pressure not exceeding 6 mm. of mercury.

7. In a process for refining wood rosin, the step which comprises distilling the same under a pressure of about 2 to 4 mm. of mercury.

8. A method of refining wood-rosin, said rosin having been obtained from dead trees, said method including the steps of distilling the wood-rosin in high vacuum of 8 millimeters mercury column and less in the absence of foreign gases.

9. The process of producing a light colored wood rosin from a dark colored wood rosin which comprises distilling the dark colored wood rosin under a high vacuum of 8 mm. mercury column or less which is sufficient to prevent substantial decomposition of the rosin and isolating a fraction higher in abietic acid content than the dark colored rosin.

10. The process of preparing wood rosin substantially free from resenes and color bodies which comprises distilling a dark colored wood rosin under a high vacuum in the absence of foreign gases and isolating an intermediate fraction higher in abietic acid content than the dark colored rosin.

11. The process of preparing a wood rosin substantially free from resenes and color bodies which comprises distilling a dark colored wood rosin in the presence of an inert gas or vapor while maintaining a vacuum of 8 millimeters mercury column or less.

12. The process of refining wood rosin which comprises distilling wood rosin of Grade E to F under an absolute pressure of about 2 to 4 millimeters of mercury at temperatures from about 220 to 270° C. and isolating an intermediate fraction high in abietic acid content and substantially free from color bodies.

13. The process of refining a low grade wood rosin which comprises distilling said rosin under an absolute pressure of 8 millimeters mercury column and less at temperatures between 220 to 270° C., separating a forerun to a point where the abietic acid content of the distillate approaches that of the initial material and recovering a subsequent fraction to a point where the abietic acid content of the distillate falls below that of the initial material.

HENRY R. LEE.